Nov. 20, 1956  J. T. SCHOTT  2,771,580
TEST PROBE
Filed April 27, 1953

INVENTOR
J. T. SCHOTT
BY
ATTORNEY

2,771,580
TEST PROBE

John T. Schott, Plainfield, N. J., assignor to Bell Telephone Laboratories, Incorporated, New York, N. Y., a corporation of New York Application April 27, 1953, Serial No. 351,301

5 Claims. (Cl. 324—72.5)

This invention relates to test probes for electrical measuring instruments and more particularly to a safety probe for use with instruments employed in high sensitivity ranges.

In measuring small voltages, for example with a vacuum tube voltmeter, where accuracy and high sensitivity are required, it is essential that the instrument be precisely "zeroed" before each observation. In other words, random deflections from the zero or index mark of the meter scale resulting from noise pickup, voltage supply changes, switching of scales, and like causes must be eliminated. This is accomplished customarily by shorting the meter input, observing the indicator position on the instrument scale and resetting to the zero or index mark as necessary.

"Zeroing" with a conventional probe, not of the safety type, as a practical matter customarily requires clipping the probe grounding wire test clip onto the probe contactor thus shorting the meter input, observing the indicator position on the instrument scale, resetting to the zero or index mark as necessary, disconnecting the ground clip lead from the probe contactor, connecting the ground clip lead to the chassis on which a measurement is to be made, and finally applying the probe contactor to the point of measurement. If, for any reason, after following this routine, any appreciable delay results before the actual measurement can be made, it is usually the practice to repeat the entire "zeroing" procedure. Such procedure is both time-consuming and inefficient.

It is an object of this invention to facilitate the making of electrical measurements.

It is a further object of this invention to provide a test probe which is both safe and enables facile indexing of the associated indicating device.

Probes for use with electrical measuring instruments may be advantageously of the safety type wherein the test electrode is shielded at all times by an insulating sleeve which retracts only sufficiently to allow the electrode tip to contact the test point. The probe of this invention combines the safety features of the retractable insulating shield with an associated contact arrangement for shorting the meter input except during the taking of measurements. It is thereby possible to tell at a glance whether the test equipment is ready for use and to readily make any necessary zero adjustment. This is particularly advantageous in the laboratory or switchgear room where noise pickup especially may provide marked interference.

In one specific embodiment of this invention, a test probe of the retractable sleeve type is equipped with an auxiliary circuit from the test electrode to the ground circuit of the test instrument. Arranged in a part of the auxiliary circuit are contact members secured to and moving with the retractable sleeve. With the sleeve in the extended non-measuring position the contacts are closed completing the circuit to ground and effectively shorting the instrument input. A glance at the instrument indicator at any time will disclose whethere any "zeroing" adjustment is necessary. In making measurments, the ground clip lead is first connected to the chassis on which a measurment is to be made after which the open sleeve end of the probe is placed over the point to be tested. The probe is then urged inward toward the test terminal which forces the spring-biased sleeve to retract until the test electrode contacts the terminal. The auxiliary circuit contact members move with the sleeve thereby opening the circuit to ground and placing the test circuit in condition for measuring. Releasing pressure allows the sleeve to return to the extended position and the input circuit to the instrument is again grounded.

Thus, a feature of this invention pertains to means for grounding the test electrode of a probe associated with a retractable insulating sleeve for shielding the electrode.

A more complete understanding of the objects and features of this invention will be obtained from the following description taken in connection with the drawing in which.

Figure 1:
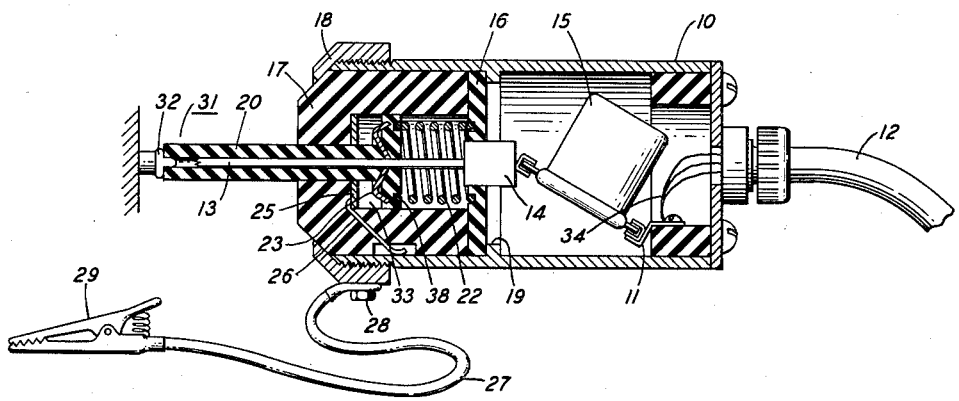
Fig. 1 is a sectional view of a test probe constructed in accordance with this invention and especially suitable for use with a vacuum tube-voltmeter.

Referring first to Fig. 1, the hollow cylindrical metallic body 10 forms a housing containing the probe elements. The test circuit comprises the electrode 13, capacitor 14, and diode 15, and the terminal assembly 11 to which the instrument leads 12 are connected. The diode 15 is supported between the terminal strap 34 and capacitor 14. The capacitor 14 with attached electrode 13 is supported by insulating disc 16. The insulating headpiece 17 is held in place by the retainer ring 18 and in turn forces the insulating disc 16 against the shoulder 19. The insulating sleeve 20 is slidably mounted within an aperture in the headpiece 17 and around the electrode 13. An enlarged portion 38 of the sleeve restricts its travel within the counterbore 33 of the headpiece 17.

The sleeve member is urged to the outward or normal position by the spring 22. The probe is shown in Fig. 1 with the insulating sleeve 20 partially retracted and the test electrode 13 not yet in contact with the apparatus terminal 32. A circuit to the instrument ground is provided from the test electrode 13 through the spring members 23 carried by the enlarged section 38 of the sleeve 20. With the sleeve in the extended position, the spring members 23 contact the metallic washer 25 which is connected by spring contact 26 to the metallic housing 10. For the purposes of illustration, lead 27 is shown connected to the ground terminal 28 on the housing 10 and is provided with a clip 29 for grounding the test instrument to the apparatus.

Figure 2:
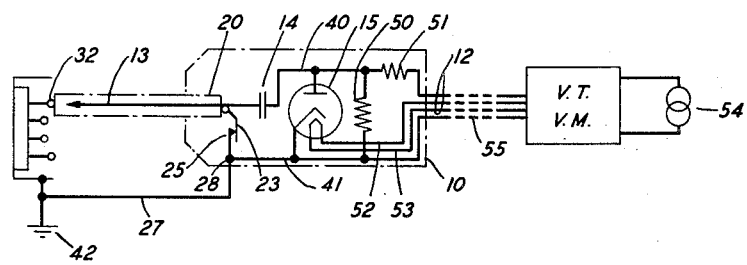
Fig. 2 is a diagram of a test circuit with the instrument input grounded.

Referring now to Fig. 2, the probe 10 is indicated in dotted outline as is the insulating sleeve 20 shown here in the extended position. Indicated for completeness are the usual resistors 50 and 51 and cathode heater supply leads 52 and 53. Also shown is an electrical power source 54. With the electrode 13 in the non-contacting position the contacts 23 and 25 are closed effectively shorting the diode 15 input through the probe leads 40 and 41. The instrument ground circuit 41 customarily is composed of the metallic housing of the probe which is electrically connected to the meter through the metallic shield 55 covering the cable leads 12.

Figure 3:
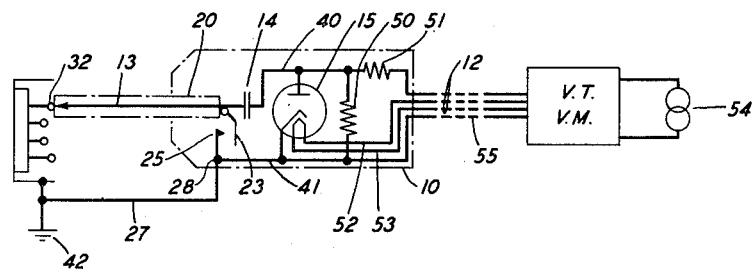
Fig. 3 is a diagram of the test circuit in condition for measuring.

In Fig. 3 the sleeve 20 has been forced back to bring the electrode 13 into contact with the terminal 32. The contacts 23 and 25 are opened thereby and the measuring circuit is indicated from the electrode 13, through probe lead 40 to the diode 15 and from the diode 15 through probe lead 41 and ground lead 27 to the common ground 42 of the apparatus under test.

Preparatory to taking measurements with the probe of Fig. 1 connected to an instrument and the lead 27 properly grounded to the chassis under measurement, the operator need only observe and reset the zero scale reading as necessary since the instrument input is continuously shorted. A test reading is taken by placing the insulating sleeve tip 31 over the test terminal 32 and urging the probe toward the terminal. The insulating sleeve 20 retracts against the pressure of the spring 22 drawing the spring contact members 23 away from the metallic washer 25 and immediately opening the circuit from the electrode 13 to ground terminal 28. The sleeve 20 retracts until the electrode 13 contacts the test terminal 32 at which juncture the instrument reading may be observed. Releasing the probe allows the spring 22 to force the sleeve 20 outwardly to the normal position where the instrument input is again effectively shorted through the spring contacts 23.

It is to be understood that the above-described arrangement is illustrative of the application of the principles of this invention. Numerous other arrangements may be devised by those skilled in the art without departing from the spirit and scope of the invention.

What is claimed is:

1. In a test probe, an electrode, an insulating member slidably mounted on said electrode, means biasing said insulating member to an extended position shielding said electrode, means defining circuits from said electrode, said means comprising a test circuit and a ground circuit, said ground circuit including contact members associated with said insulating member, said contact members arranged to close said ground circuit only when said insulating member is in the extended position.

2. A test probe comprising a body member, a test electrode fixedly mounted in said member and protruding therefrom, said electrode having circuit means connected thereto, an insulating sleeve surrounding said electrode and slidably mounted thereon, means in said body member biasing said sleeve outwardly to an extended position covering said electrode, means defining a circuit between said test electrode and ground, and means for opening said circuit to ground only when said sleeve is moved from its extended position.

3. A test probe comprising a tubular housing member, a test electrode insulatedly mounted in said member and protruding therefrom, a movable coaxial insulating sleeve slidably mounted on said electrode, means in said housing member biasing said sleeve outwardly to an extended position covering said electrode, dual means defining circuits from said electrode to an associated testing device and to ground, said ground circuit including means associated with said movable sleeve for opening said circuit.

4. A test probe comprising a tubular metallic housing member, a test electrode insulatedly mounted in said member and protruding therefrom, a movable coaxial insulating sleeve enclosing said electrode and slidably mounted thereon, a spring member in said housing biasing said sleeve outwardly to an extended position protruding beyond the tip of said electrode, a conductive circuit terminating in said electrode for connecting to an associated indicating device, a ground terminal mounted on said housing member, and a conductive circuit between said electrode and said ground terminal including means for opening said circuit when said sleeve is retracted, said means comprising contact members mounted in said movable sleeve.

5. In a test probe having an outer tubular casing, a cylindrical insulating plug in one end of said casing, said plug having a recess extending from the inner end and an aperture in the outer end, a insulating disc in juxtaposition with respect to the inner end of said plug and fixedly positioned relative thereto, a conductive washer member fixedly positioned at the end of said recess, a capacitor housing member fixedly supported in said disc, a conductive rod member secured to said housing member and coaxially protuberant from said aperture of said plug, a retractile insulating sleeve member slidably mounted within said aperture and over said rod member, said sleeve member having an enlarged portion at one end for slidably fitting within said recess of said plug and having a length sufficient to extend slightly beyond the end of said conductive rod member when said enlarged portion bears against said washer member, spring means within said recess biasing said sleeve member outwardly from said plug, a plurality of conductive spring members retainedly positioned in said enlarged portion of said sleeve member for providing an electrical circuit between said conductive rod member and said washer member when said enlarged portion is biased against said washer member, and a conductive member in said plug for providing a circuit between said washer member and electrical ground whereby said conductive rod member is grounded when said sleeve member is in the outwardly biased position.

References Cited in the file of this patent

UNITED STATES PATENTS

| | | |
|---|---|---|
| 1,650,779 | Williams | Nov. 29, 1927 |
| 2,020,402 | Edwards et al. | Nov. 12, 1935 |
| 2,418,872 | Fisher | Apr. 15, 1947 |
| 2,508,956 | Litwin | May 23, 1950 |